Oct. 15, 1935.        A. WILLINK        2,017,083
BRAKE
Original Filed April 25, 1930

Inventor
Arthur Willink
By W. N. Roach
Attorney

Patented Oct. 15, 1935

2,017,083

UNITED STATES PATENT OFFICE 2,017,083

BRAKE

Arthur Willink, United States Army, Philadelphia, Pa.

Original application April 25, 1930, Serial No. 447,391. Divided and this application January 5, 1934, Serial No. 705,386

1 Claim. (Cl. 188—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a brake and is a division of copending application, Serial No. 447,391 of April 25, 1930.

The purpose of the present invention is to provide a brake mechanism employing reversible worm gearing to establish friction and obtain a balance between a small force and a large force, whereby the small force may control the large force.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A preferred embodiment of the invention is illustrated in the accompanying drawing, wherein.

Figure 1:
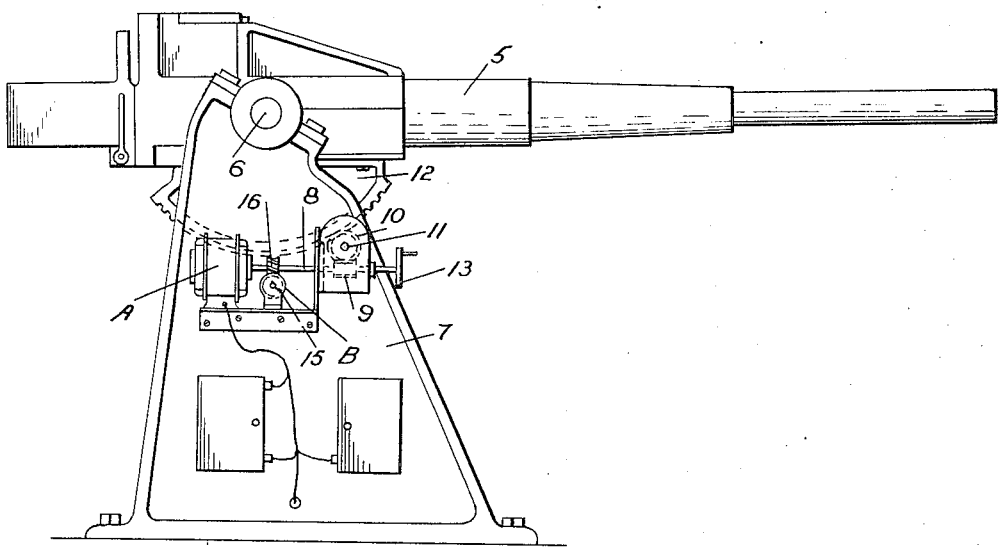
Fig. 1 is a view in side elevation of a gun equipped with the improved brake mechanism.
Figure 2:
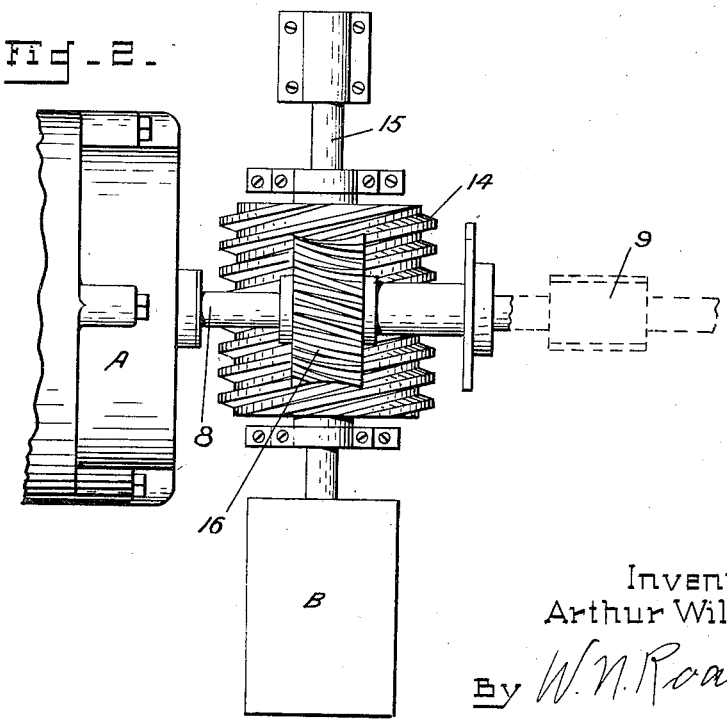
Fig. 2 is a plan view of the gear brake.

Referring to the drawing by character of reference, there is shown a gun 5 mounted for movement in elevation on trunnions 6 supported in a pedestal 7. The gun is actuated by an electric power motor A, capable without overheating, of delivering a certain specified torque when stalled with the power on. The power shaft 8 of the motor A has a worm 9 meshing with a worm wheel 10 on a shaft 11 geared to the elevating arc 12 of the gun. A handwheel 13 on the end of the shaft 8 provides for manual operation.

A control motor B which is the receiver of a self-synchronous system for the transmission of angular motion is placed in the vicinity of the member whose movements are to be controlled, in the present instance, this member being the power shaft 8.

The control motor B is arranged with its axis at right angles to the power shaft 8 and controls a mechanical friction brake for the power shaft, consisting of a worm wheel 14 on the shaft 15 of the control motor meshing with a worm 16 on the power shaft 8.

The worm gearing is barely reversible, being close to the critical helix angle which is approximately 10 to 12 degrees depending on the particular metal of the gears.

The torque transmitted from the power motor through the gearing to the control shaft must be balanced by the torque of the control motor plus frictional torque in order to hold the shaft 8 against rotation. With a torque ratio of 40 to 1 between the power motor and control motor the reversible gearing automatically provides the friction necessary to balance the forces.

The reversible gearing enables the power motor to take up all friction in the control system. The friction applied in the control shaft acts as a stabilizer on the control and gives smooth operation with practically zero torque.

This type of gearing permits the power shaft to be directly connected to a load without the use of a clutch so as to provide for manual operation when the source of power fails. The absence of a clutch simplifies resynchronization of the system after failure of the electric power.

In operation when it is desired to move the gun, the specified degree and direction of angular displacement is transmitted to and reproduced by the receiving motor B of the Selsyn System. When the motor B turns the worm wheel 14 the motor A is free to turn the worm 16 which is on the shaft 8 leading to the elevating mechanism of the gun. When the motor B stops the shaft 8 is held against further rotation and the motor A is stalled with the power on.

I claim:

In a brake mechanism, a reversible power motor having a drive shaft, a worm on said shaft, a control motor having a shaft adjacent the drive shaft, and reversible worm wheel close to the critical helix angle and meshing with the worm, said gearing applying friction in the control shaft whereby the control motor balances the power motor.

ARTHUR WILLINK.